March 14, 1933.     C. HOCHSTATTER     1,901,811

MEASURING AND DISPENSING DEVICE FOR CONTAINERS

Filed April 11, 1932

INVENTOR
Charles Hochstatter.
BY Munn & Co.
ATTORNEYS.

Patented Mar. 14, 1933

1,901,811

UNITED STATES PATENT OFFICE

CHARLES HOCHSTATTER, OF OZONE PARK, NEW YORK

MEASURING AND DISPENSING DEVICE FOR CONTAINERS

Application filed April 11, 1932. Serial No. 604,621.

This invention relates to measuring and dispensing devices for granular substances, and while not necessarily restricted to such use, the device finds its principal application to sugar dispensers for restaurants, by virtue of which means is afforded for dispensing uniform measured quantities, such as a teaspoonful, upon each inversion of the container.

Many devices of this nature and for this purpose have been heretofore devised, but apparently none, if any of them, has been extensively used or proven practical, which is undoubtedly due to their tendency to become clogged, their failure to properly dispense a uniform quantity or possibly for other reasons which it is not thought necessary to here set down.

The present invention aims to provide an improved device of the indicated character, by virtue of which uniformly measured quantities are dispensed upon each inversion of the container, and this irrespective of a reasonable variation in the speed with which the inversion is accomplished or irrespective of the direction in which the inversion is effected.

As a further feature, the invention comprehends a measuring and dispensing means by virtue of which a more complete dispensation of the contents from the container is attained while insuring a proper measurement of the predetermined uniform quantity.

The invention further resides in the provision of a measuring and dispensing device which may be economically produced, which is simple in its construction and mode of use and which is highly efficient in its purpose.

With the above recited and other objects in view, reference is had to the following description and accompanying drawing, in which there is exhibited one example or embodiment of the invention, while the claims define the actual scope of the same.

Figure 1:
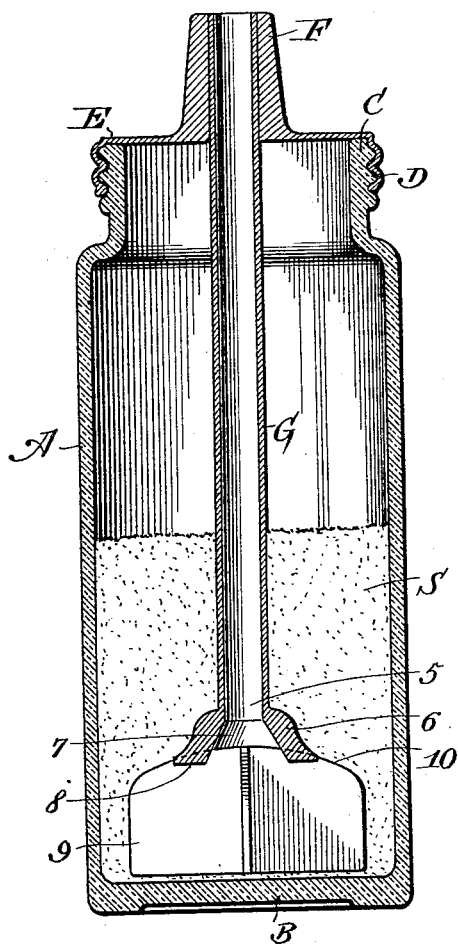
Figure 1 is a vertical sectional view through a dispensing container equipped with a measuring and dispensing means constructed in accordance with the invention.
Figure 2:
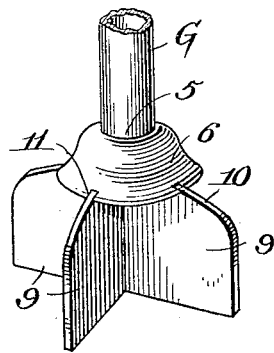
Figure 2 is a fragmentary perspective view of the inlet end of the dispensing tube.

Referring to the drawing by characters of reference, A designates a container, such as a glass jar, which is closed at the bottom by a bottom wall B and which is provided with an open neck C at the top having an exterior thread D. The open top is closed by a removable cap E which is threadedly engaged on the neck and which is provided with a centrally disposed outlet nozzle F from which a dispensing tube G extends downwardly toward the bottom B of the container or jar. The lower or inlet end 5 of the tube G is located within and adjacent the bottom B of the container, and said inlet end is provided with a terminal member or head 6 which may either be formed integral with the tube or as a separate piece, within the scope of the invention. The said member or head 6 is formed with an inwardly tapering frusto-conical mouth or bore 7 and preferably with a flat annular wall or surface 8 surrounding the larger outer end of the mouth and extending laterally outward therefrom and in a plane perpendicular to the axis of the tube. A plurality, preferably four or more angularly related blades 9 are provided at the outer end of the mouth, and said blades are disposed in planes coinciding with the axis of the tube and with the vertices of the angles defined by the blades disposed substantially in line with the axis of the mouth tube. In practice, the blades are of such a width that they extend laterally an appreciable distance beyond the marginal wall 8 of the outer end of the terminal member or head 6, and the outer or lower edges of said blades are in closely spaced relation to the bottom B of the container or jar A. The inner or upper edges 10 of the blades are curved and preferably extend slightly into the mouth 7 and are secured in place in radial receiving notches 11 in the member or head 6.

Figure 3:
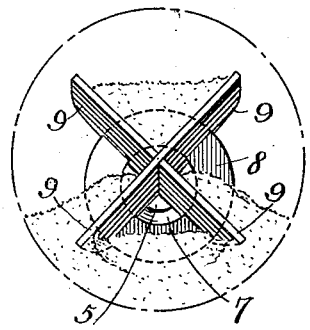
Figures 3 and 4 are diagrammatic perspective views illustrating dispensing positions of the device.
Figure 4:
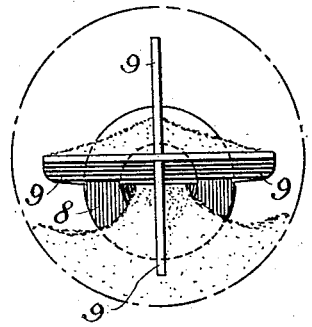

In use and operation, with the container in the upright position illustrated in Figure 1, an inversion of the same to a dispensing position initially causes a predetermined uniform quantity of the sugar or other granular contents S to be directed into the frusto-conical mouth or bore 7, and this irrespective of the direction of the inversion or a reasonable variation in the speed with which the inversion is accomplished. In Figure 3, the combined areas of the effective surfaces of the blades and the wall 8 will direct the same quantity into the mouth 7 as will be directed when the blades are in the position illustrated in Figure 4 or any other intermediate position between these positions. In other words, it is immaterial how the user picks up and inverts the container, while the variation in the speed of inversion within reasonable bounds will in no way affect the predetermined quantity of sugar which will be dispensed.

While there has been illustrated and described a preferred embodiment of the invention, no limitation is intended to the precise structural details, as variations and modifications thereof which fall within the scope of the appended claims may be resorted to when desired.

What is claimed is:

1. In a measuring dispenser for granular substances including a dispensing tube, a terminal member at the inlet end of said tube and angularly related blades at the outer end of the terminal member, said blades being disposed in planes coinciding with the axis of the terminal member.

2. In a measuring dispenser for granular substances including a dispensing tube, a terminal member at the inlet end of said tube having an inwardly tapering mouth and angularly related blades at the larger outer end of the mouth said blades being disposed in planes coinciding with the axis of the mouth and with the vertices of the angles defined by the blades disposed substantially in line with the axis of the mouth.

3. In a measuring dispenser for granular substances including a container and a dispensing conduit having an inlet end located within and adjacent the bottom of the container, a terminal head at said inlet end, said head having a mouth tapering inwardly and communicating with the conduit and angularly related blades at the larger outer end of the mouth, said blades disposed in planes coinciding with the axis of the mouth.

4. In a measuring dispenser for granular substances including a container and a dispensing conduit having an inlet end located within and adjacent the bottom of the container, a terminal head at said inlet end, said head having a mouth tapering inwardly and communicating with the conduit and angularly related blades at the larger outer end of the mouth, said blades disposed in planes coinciding with the axis of the mouth and said blades radiating from a line coinciding with the axis of the mouth.

5. In a measuring dispenser for granular substances including a dispensing tube, a terminal head at the inlet end of the dispensing tube and a substantially cruciform blade intersecting the mouth with the axis of intersection of the blade wings in alignment with the axis of the mouth.

6. In a measuring dispenser for granular substances including a dispensing tube, a terminal member at the inlet end of the tube having a frusto-conical mouth tapering inwardly and joining the bore of the tube and a flat annular wall disposed in a plane perpendicular to the axis of the tube and surrounding the larger outer end of the mouth and a substantially cruciform blade intersecting the mouth at the larger outer end thereof.

7. In a measuring dispenser for granular substances including a dispensing tube, a terminal member at the inlet end of the tube having a frusto-conical mouth tapering inwardly and joining the bore of the tube and a flat annular wall disposed in a plane perpendicular to the axis of the tube and surrounding the larger outer end of the mouth and a substantially cruciform blade intersecting the mouth at the larger outer end thereof having radial wings defining re-entrant angles, the vertices of which are in substantial alignment with the axis of the mouth and tube.

8. A device for dispensing uniformly measured quantities of granular material from a container upon each inversion thereof including a tube having an outlet at the upper end and an inlet at the lower end, said inlet being disposed within and adjacent the bottom of the container and a terminal member at said tube inlet end, said member having an inwardly tapering frusto-conical mouth joining the tube bore and a flat annular wall surrounding the larger outer end of the mouth and extending outwardly therefrom in a plane perpendicular to the axis of the tube and angularly related blades at the outer end of the mouth disposed in planes coinciding with the axis of the tube.

9. A device for dispensing uniformly measured quantities of granular material from a container upon each inversion thereof including a tube having an outlet at the upper end and an inlet at the lower end, said inlet being disposed within and adjacent the bottom of the container and a terminal member at said tube inlet end, said member having an inwardly tapering frusto-conical mouth joining the tube bore and a flat annular wall surrounding the larger outer end of the mouth and extending outwardly therefrom in a plane perpendicular to the axis of the tube and angularly related blades at the outer end of the mouth disposed in planes coinciding with the axis of the tube and with the vertices of the angles defined by the blades disposed substantially in alignment with the axis of the tube.

CHARLES HOCHSTATTER.